United States Patent Office 3,746,723
Patented July 17, 1973

3,746,723
PROCESS FOR THE PRODUCTION OF
ALKYLENE SULFIDE
Hitoshi Nakajima, 2716 Kawarabuki Ageo-shi, Saitama-Prefecture, Japan, and Masazumi Chono, 2632 Shiki Adachi-machi, Kitaadachi-gun, Saitama-Prefecture, Japan
No Drawing. Filed Dec. 21, 1970, Ser. No. 100,347
Claims priority, application Japan, Jan. 21, 1970, 45/5,043
Int. Cl. C07d 59/00
U.S. Cl. 260—327 E          5 Claims

ABSTRACT OF THE DISCLOSURE

An economically attractive process for the industrial production of alkylene sulfide is provided. The catalytic reaction of an olefinic hydrocarbon with hydrogen sulfide and oxygen is performed in a gas phase.

BACKGROUND OF THE INVENTION

Alkylene sulfide is a raw material for polysulfide which is important as a high molecular material. Various methods have been known for its production, for example methods of producing ethylene sulfide from ethylene oxide and potassium rhodanide, carbonyl sulfide or carbon disulfide, and from ethylene and sulfur chloride or from ethylene and carbonyl sulfide by means of photochemical reaction.

However, each of these methods has some economical disadvantages either in the supply source of hydrocarbon or sulfur for alkylene sulfide.

SUMMARY

The present invention is to overcome the above disadvantages of the conventional method and to achieve an economical production of alkylene sulfide.

More particularly, this invention is to provide a process for producing alkylene sulfide in one step by causing an olefinic hydrocarbon to react with hydrogen sulfide and oxygen or a mixture gas containing oxygen in a molecular state in the presence of a catalyst comprising a halogenated metal selected from the Group of I-A and II-A of the Periodic Table.

The characteristic of this invention consists in using an olefinic hydrocarbon as the direct supply source of alkylene sulfide, and further, hydrogen sulfide as the supply source of sulfur. Obviously, the use of olefine is much more economical than the use of its oxide. In addition, hydrogen sulfide as the supply source of sulfur is by far more economical than other sulfur compounds because it can be directly obtained from the desulfurization process of petroleum at present.

DETAILED DESCRIPTION OF THE INVENTION

Olefinic hydrocarbons used in this invention include for example ethylene, propylene, normal butylene, isobutylene, and the like. When ethylene, propylene or normal butylene or isobutylene is used as a raw material, ethylene sulfide, propylene sulfide, normal butylene sulfide or isobutylene is obtained respectively.

This invention uses a halogenated metal selected from the Group of I-A and II-A of the Periodic Table as a catalyst. These halogenated metals include fluorides, chlorides, bromides and iodides of lithium, sodium, potassium, rubidium, cesium, beryllium, magnesium, calcium, strontium, and barium; potassium fluoride, potassium chloride, potassium bromide, and potassium iodide, for example in use of potassium.

Each of these catalysts can be used singly or in a form supported on a carrier. As a carrier, ordinary catalyst carriers such as silicon carbide or α-alumina which are not strongly acidic or alkaline, are most suitable to be used. The usual impregnation method or mixing method is used for preparing a carrier-supported catalyst.

The amount of the catalyst to be supported on the carrier can be within the range of 0.01 to 10.0 mols, preferably 0.1 to 5.0 mols per 1 liter of the carrier.

In carrying out this invention, hydrogen sulfide is used in an amount within the range of $\frac{1}{10}$ to 50 parts by volume per 1 part by volume of the olefinic hydrocarbon. Oxygen is used in an amount within the range of $\frac{1}{100}$ to 10 parts, preferably not more than 1 part by volume per 1 part by volume of hydrogen sulfide.

In performing this invention, an inert gas can be present together with the above-mentioned gases in the gas phase, but is not always required.

The preferable temperature for use in this invention is within the range of from 200° C. up to 500° C. It is not good to use the temperature outside this range. Should the temperature be lower than 200° C., the yield of the alkylene sulfide is markedly reduced; on the contrary, should the temperature be higher than 500° C., an unfavorable side reaction violently occurs with the decomposition of the alkylene sulfide, so that the yield is reduced.

The preferred space velocity (the flow amount of the mixture gas per the volume of the catalyst, calculated into the standard state) of the mixture of an olefinic hydrocarbon, hydrogen sulfide and oxygen or a gas containing oxygen in a molecular state is from 20 hr.$^{-1}$ to 20,000 hr.$^{-1}$.

The way of the reaction applied to this invention can be either of fixed bed, moving bed or fluidized bed.

Example 1

A sodium iodide-silicon carbide catalyst was prepared according to the impregnation method as follows:

100 ml. of carbide was added to an aqueous solution containing 0.05 mols of sodium iodide, and was evaporated and dryed on a water bath. 10 ml. of the resulting catalyst packed in a reaction tube made of Pyrex glass having an outside diameter of 15 mm., was put into an electric furnace maintained at a reaction temperature of 400° C. A mixture gas of ethylene, hydrogen sulfide and air (volume ratio, 6.5:1:2.5) was introduced therein at a flow rate of 100 ml./min. After 1 hour from the beginning of the reaction, 5% of the introduced hydrogen sulfide was converted, and ethylene sulfide was produced in a yield of 30% based on the converted hydrogen sulfide. In addition, ethyl mercaptan and a small amount of sulfur dioxide were observed as by-products.

Example 2

A sodium fluoride-silicon carbide catalyst (0.5 mole/l.) was prepared as in Example 1. 10 ml. of this catalyst was packed in a reaction tube, and was inserted into an electric furnace maintained at a reaction temperature of 410° C. Then a mixture gas consisting of ethylene, hydrogen sulfide, oxygen and nitrogen (10:1:0.5:2) was introduced therein at a flow rate of 100 ml./min. After 1 hour from the beginning of the reaction, 8% of the introduced hydrogen sulfide was converted, and ethylene sulfide was produced in a yield of 22% based on the converted hydrogen sulfide.

Example 3

1 gram of potassium iodide, which is on the market, was diluted with 5 ml. of quartz sand. The resulting mixture was packed in a reaction tube, and was put in an electric furnace maintained at a temperature of 380° C. A mixture gas consisting of ethylene, hydrogen sulfide and air (volume ratio 10:1:2.5) was introduced therein at a flow rate of 100 ml./min. After 20 minutes from the beginning of the reaction, 7.2% of the introduced hydrogen sulfide was converted, and ethylene sulfide was produced in a yield of 23% based on the converted hydrogen sulfide.

Example 4

An iodide-silicon carbide catalyst was prepared as in Example 1. 10 ml. of this catalyst was packed in a reaction tube and was put in an electric furnace maintained at a temperature of 380° C. Then a mixture gas consisting of propylene, hydrogen sulfide and air (volume ratio 6.5:1:2.5) was introduced therein at a flow rate of 100 ml./min. After 1 hour from the beginning of the reaction, 10.5% of the introduced hydrogen sulfide was converted, and propylene sulfide was obtained in a yield of 22.5% based on the converted hydrogen sulfide. At the same time, normal propyl mercaptan and isopropyl mercaptan were formed. Besides these the formation of sulfur dioxide was observed.

Example 5

A potassium iodide-α-alumina catalyst (0.5 mol/l.) was prepared as in Example 1. 20 ml. of this catalyst was packed in a reaction tube, and was put in an electric furnace maintained at a temperature of 400° C. Then a mixture gas consisting of ethylene, hydrogen sulfide, oxygen and nitrogen (volume ratio 10:1:0.5:5.2) was introduced therein at a flow rate of 100 ml./min. After 2 hours from the beginning of the reaction, 5.2% of the introduced hydrogen sulfide was converted, and ethylene sulfide was produced in a yield of 15.2% based on the converted hydrogen sulfide.

Example 6

2 grams of sodium fluoride was diluted with 8 ml. of quartz sand. The resulting mixture was packed in a reaction tube and was put in an electric furnace maintained at a temperature of 350° C. Then a mixture gas consisting of normal butylene, hydrogen sulfide and air (volume ratio 6.5:1:2.5) was introduced therein at a flow rate of 100 ml./min. After 20 minutes from the beginning of the reaction, 7.8% of the introduced hydrogen sulfide was converted, and butylene sulfide was obtained in a yield of 7.5% based on the converted hydrogen sulfide. At the same time 1-butyl mercaptan and 2-butyl mercaptan were obtained.

Example 7

A calcium chloride-silicon carbide catalyst (0.5 mol/l.) was prepared as in Example 1. 10 ml. of this catalyst was packed in a reaction tube, and was put in an electric furnace maintained at a temperature of 430° C. Then a mixture gas consisting of ethylene, hydrogen sulfide and air (volume ratio 6.5:1:2.5) was introduced at a flow rate of 100 ml./min. After 1 hour from the beginning of the reaction, 12% of hydrogen sulfide was converted, and ethylene sulfide was obtained in a yield of 20.5% based on the converted hydrogen sulfide.

Examples 8–11

The reactions were carried out as in Example 1, using catalysts of lithium iodide, magnesium chloride, potassium bromide, barium iodide, strontium iodide, cesium iodide and rubidium iodide. Each result of these reactions is shown in the following table.

| Ex. No. | Catalyst | Reaction temperature, °C | Flow rate of mixture gas, m./min. | Volume ratio $C_2H_4$ | Volume ratio $H_2S$ | Volume ratio Air | Conversion ratio of $H_2S$, percent | Yield,[1] percent |
|---|---|---|---|---|---|---|---|---|
| 8 | Lithium iodide (1 g.) | 380 | 100 | 6.5 | 1 | 2.5 | 6.8 | 15.2 |
| 9 | Magnesium chloride-silicon carbide (1.0 mol/l.) | 410 | 100 | 10 | 1 | 2.0 | 7.8 | 10.6 |
| 10 | Potassium iodide-silicon carbide (1.0 mol/l.) | 400 | 100 | 10 | 1 | 2.0 | 13.5 | 20.8 |
| 11 | Barium iodide (2 g.) | 370 | 100 | 6.5 | 1 | 2.5 | 18.5 | 8.5 |
| 12 | Strontium iodide-silicon carbide (0.5 mol/l.) | 350 | 100 | 6.5 | 1 | 2.5 | 16.5 | 18.5 |
| 13 | Cesium iodide (1 g.) | 420 | 100 | 10 | 1 | 2.5 | 9.5 | 6.5 |
| 14 | Rubidium iodide-silicon carbide (0.5 mol/l.) | 400 | 100 | 10 | 1 | 2.5 | 12.5 | 10.5 |
| 15 | Beryllium iodide-α-alumina (0.1 mol/l.) | 420 | 100 | 10 | 1 | 2.5 | 7.2 | 12.6 |

[1] Ethylene sulfide based on converted $H_2S$.

What is claimed is:

1. A process for producing alkylene sulfide, which comprises the catalytic reaction of an olefinic hydrocarbon with hydrogen sulfide and oxygen in a molecular state in the presence of a catalyst selected from the class consisting of fluorides, chlorides, bromides and iodides of lithium, sodium, potassium, rubidium, cesium, beryllium, magnesium, calcium, strontium and barium, the reaction temperature being between 200° and 500° C.

2. A process as claimed in claim 1, wherein each of the catalysts is supported on a carrier selected from the class consisting of silicon carbide and α-alumina.

3. A process as claimed in claim 1, wherein the amount of the hydrogen sulfide is within the range of 1/10 to 50 volumes per a volume of the olefinic hydrocarbon, the amount of the oxygen being within the range of 1/100 to 10 volumes per a volume of hydrogen sulfide.

4. A process as claimed in claim 1, wherein an olefinic hydrocarbon, hydrogen sulfide and oxygen in a molecular state are introduced onto a catalyst at a space velocity of from 20 hr.$^{-1}$ to 20,000 hr.$^{-1}$.

5. A process as claimed in claim 1, wherein an olefinic hydrocarbon is ethylene, propylene, normal butylene and iso-butylene.

References Cited
UNITED STATES PATENTS
2,729,634  1/1956  Dearborn _____ 260—239.5

HENRY R. JILES, Primary Examiner

C. M. S. JAISLE, Assistant Examiner